United States Patent Office
3,553,260
Patented Jan. 5, 1971

3,553,260
RADIOPAQUE DERIVATIVES OF α-PHENOXY-PHENYLACETIC ACID
Ernst Felder and Davide Pitre, Milan, Italy, assignors to Bracco Industria Chimica, Societa per Azioni, Milan, Italy
No Drawing. Filed May 14, 1968, Ser. No. 728,895
Claims priority, application Switzerland, May 29, 1967, 7,481/67
Int. Cl. C07c *103/32*
U.S. Cl. 260—519        9 Claims

ABSTRACT OF THE DISCLOSURE

α - (3 - N-alkyl-N-acetylamino-2,4,6-triiodophenoxy)-phenylacetic acid and closely related derivatives of the formula

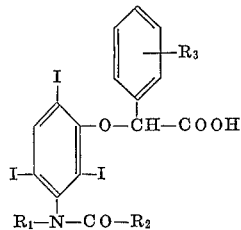

wherein $R_1$ is lower alkyl, $R_2$ is hydrogen or lower alkyl, and $R_3$ is hydrogen, halogen or lower alkyl, and the physiologically tolerated, water soluble metal or amine salts thereof are radiopaque, tend to accumulate in the gall bladder when applied orally, and are non-toxic in effective amounts. The corresponding lower alkyl esters are intermediates in the synthesis of the acids and salts.

---

This invention relates not novel, iodine bearing, radiopaque, organic compounds, to their preparation and to their use in contrast media for cholecystography.

Iodine bearing organic compounds are commonly employed in radiography, particularly for visualizing the gall bladder. When the known contrast media are applied orally to cholecystography, they are not very readily resorbed from the intestinal tract so that the density of the contrast achieved may leave something to be desired. Known contrast media which are applied intravenously are often superior in this respect, but may lead to dangerous and even lethal accidents.

It has now been found that carboxylic acids of the formula

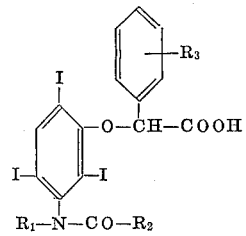

wherein $R_1$ is lower alkyl, $R_2$ is hydrogen or lower alkyl, and $R_3$ is hydrogen, halogen or lower alkyl, and their salts have a greater tendency to accumulate in the gall bladder than compounds which are closely related to them in chemical structure, and than compounds which were most commonly employed heretofore in the clinical practice of cholecystography.

Nine compounds of the invention, four chemically related compounds, and three radiopaque compounds now in clinical use for cholecystography are listed below in Table 1 together with their toxicities in oral application (p.os) and intravenous application (i.v.) to white mice ($DL_{50}$, mg./kg.), after 12 days, the percentage of each compound that was secreted into the gall bladder with bile and with urine respectively three hours after intravenous application of 100 mg./kg. to rabbits, and the ratio of these percentage figures which is a useful measure of the X-ray contrast to be expected from a fixed dosage after application.

The sixteen compounds listed are identified in the table by capital letters as follows:

(A) α-(3-N-methyl-N-acetylamino-2,4,6-triiodophenoxy)-phenylacetic acid
(B) α-(3-N-ethyl-N-acetylamino-2,4,6-triiodophenoxy)-phenylacetic acid
(C) α-(3-N-methyl-N-propionylamino-2,4,6-triiodophenoxy)-phenylacetic acid
(D) α-(3-N-methyl-N-acetylamino-2,4,6-triiodophenoxy)-m-tolylacetic acid
(E) α-(3-N-ethyl-N-acetylamino-2,4,6-triiodophenoxy)-m-tolylacetic acid
(F) α-(3-N-methyl-N-acetlyamino-2,4,6-triiodophenoxy)-o-tolylacetic acid
(G) α-(3-N-ethyl-N-acetylamino-2,4,6-triiodophenoxy)-o-tolylacetic acid
(H) α-(3-N-methyl-N-acetylamino-2,4,6-triiodophenoxy)-p-iodophenylacetic acid
(I) α-(3-N-ethyl-N-acetylamino-2,4,6-triiodophenoxy)-p-iodophenylacetic acid
(K) α-(3-acetylamino-2,4,6-triiodophenoxy)-phenylacetic acid
(L) α-3-N-methyl-N-acetylamino-2,4,6-triiodphenoxy-acetic acid
(M) α-3-acetylamino-2,4,6-triiodophenoxybutyric acid
(N) α-3-acetylamino-2,4,6-triiodophenoxycaproic acid
(O) α-ethyl-β-3-amino-2,4,6-triiodophenylpropionic acid
(P) α-ethyl-β-(3-hydroxy-2,4,6-triiodophenyl)-propionic acid
(Q) α-(3-dimethylaminomethyleneamino-2,4,6-triiodophenyl)-propionic acid

TABLE 1

| Compound: | Toxicity, $DL_{50}$ | | Secretion, percent | | Secretion ratio, bile/urine |
|---|---|---|---|---|---|
| | p.os | i.v. | Bile | Urine | |
| A | 2,200 | 500 | 56.4 | 22.4 | 2.5 |
| B | 2,300 | 365 | 24 | 6 | 4.0 |
| C | 2,000 | 440 | 25.9 | 7.3 | 3.5 |
| D | 2,500 | 385 | 26 | 4 | 6.5 |
| E | 1,850 | 490 | 36 | 11 | 3.3 |
| F | 2,500 | 580 | 25 | 8 | 3.1 |
| G | 2,400 | 500 | 38 | 3.5 | 11 |
| H | 2,250 | 500 | 17.5 | 0.85 | 20.58 |
| I | 3,400 | 325 | 12.17 | 0.84 | 15.8 |
| K | 10,000 | 1,000 | 7.73 | 71.27 | 0.1 |
| L | 3,000 | 1,500 | 13.7 | 53.9 | 0.25 |
| M | 8,000 | 1,400 | 10–11 | 80 | 0.14 |
| N | 1,500 | 450 | 17.5 | 30.4 | 0.6 |
| O | 1,540 | 285 | 28 | 13 | 2.15 |
| P | 1,360 | 345 | 12.3 | 30 | 0.4 |
| Q | 855 | 240 | 15.4 | 13.4 | 1.1 |

As is evident from comparison of the secretion data for the compounds A–I of the invention with the corresponding data for the chemically related compounds K–N, the compounds of the invention are distinguished by their hepatotropism, that is, their tendency to be excreted preferentially from the blood by the liver into the gall bladder with the bile, a primary requirement for a good contrast agent for cholecystography. The compounds of the invention are superior in this respect even to the most commonly used contrast agent for cholecystography, iodopanoic acid (compound O). The difference in hepatotropism between the nine compounds of the invention and the very similar compound K is particularly striking.

The toxicity data of the listed compounds of the invention compare favorably with those of the known compounds O, P and Q which are now in common clinical use.

In actual cholecystography tests on dogs with 200 mg. per kg., orally, compounds A and C provided gall bladder shadows two hours after application, and good contrast 6 and 8 hours after application. Some features of the gall bladder were still recognizable after 24 hours with compound A.

Compound B gave distinct and clear images of the gall bladder already two hours after application, and excellently defined, sharp images after 6 and 8 hours. Good radiographs with adequate contrast were produced even after 24 hours. Compound B was best among the compounds of the invention tested on dogs, and has been used successfully in humans in oral adult doses of 3 g.

Good results in tests on dogs were also achieved with compounds D, E and G, and superior radiographs were obtained with compound F. Cholecystography on dogs was also successful with the two following compounds:

α-(3-N-methyl-N-acetylamino-2,4,6-triiodophenoxy)-p-tolylacetic acid, and

α-(3-N-ethyl-N-acetylamino-2,4,6-triiodophenoxy)-p-tolylacetic acid.

The carboxylic acids of the invention may be prepared by alkylating a compound of the formula

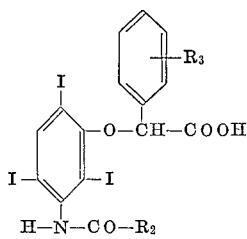

with an alkyl halide, sulfate or sulfonate, or by condensing a triiodophenol derivative of the formula

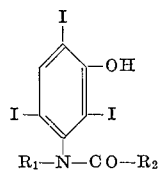

with a reactive derivative of an alkyl phenylacetate of the formula $R_3$—$C_6H_4$—CHY—COOR$_4$, wherein $R_1$, $R_2$, $R_3$ are as defined above, $R_4$ is lower alkyl, and Y is the reactive radical of a strong acid, such as halogen (chlorine, bromine or iodine), a sulfate radical, or the radical of an alkyl or aryl sulfonate. The condensation is performed in the presence of a basic condensation agent.

The water-soluble salts of the carboxylic acids of the invention with physiologically tolerated metals and amines are equally effective, and their toxicities are not significantly different from those of the corresponding free acids. The cationic moieties of these salts may be provided, for example by alkali metals, such as sodium or lithium, by alkaline earth metals, such as magnesium or calcium, and by the amines commonly employed in pharmaceutical compositions as salts with physiologically active acids, such as N-methylglucamine, diethanolamine or morpholine. The lower alkyl esters of the carboxylic acids are useful intermediates in the synthesis of the latter and may themselves be used as X-ray contrast agents.

The following examples are illustrative of the preparation of the α-phenoxyphenylacetic acid derivatives of the invention and of their use in radiography.

EXAMPLE 1

52.8 g. 3-acetylamino-2,4,6-triiodophenol (0.1 mole) were added at 40° C. to a sodium alcoholate solution prepared from 2.5 g. sodium (0.11 gram-atom) and 60 ml. ethanol. The mixture was heated at 80°–90° C. while 26.7 g. ethyl α-bromophenylacetate were added, and the reaction mixture was refluxed for 40 hours with continuous agitation.

It was then poured into 400 ml. water, and extracted with 700 ml. methylethylketone. The extract was washed with water, dried over sodium sulfate and sodium carbonate, filtered, and evaporated to dryness in a vacuum. The residue was recrystallized from ethyl acetate. 49.5 g. ethyl α-(3-acetylamino-2,4,6-triiodophenoxy)-phenylacetate were obtained. M.P. 147°–148° C.

34.5 g. ethyl α-(3-acetylamino-2,4,6-triiodophenoxy)-phenylacetate were heated for one hour with 3 g. sodium hydroxide in 250 ml. methanol and 500 ml. water, whereby the ester was saponified to the sodium salt. The saponification mixture was filtered and the filtrate was diluted with water and acidified at 40° C.

α-(Acetylamino - 2,4,6 - triiodophenoxy)-phenylacetic acid was precipitated. It was filtered off with suction, washed, dried and recrystallized from methanol. It weighed 29 g. (88% yield) and melted at 223° C. A thin layer chromatogram on silica gel (GF 254, Merck) prepared with a 19:1 mixture of chloroform and glacial acetic acid gave an $R_F$ value of 0.22. All $R_F$ values reported hereinafter were determined on the same absorbent with the same solvent.

Higher homologs and derivatives of α-(acetylamino-2,4,6-triiodophenoxy)-phenylacetic acid are prepared in an analogous manner. Ethyl α-(3-propionylamino-2,4,6-triiodophenoxy)-phenylacetate melts at 173°–175° C., the corresponding free acid at 205°–206° C. $R_F$=0.32.

3-acetylamino-2,4,6-triiodophenol is condensed similarly with ethyl α-bromo-4-iodophenylacetate to α-(3-acetylamino-2,4,6-triiodophenoxy)-p-iodophenylacetate of M.P. 222°–223° C., $R_F$=0.65, which is readily saponified in a methanol solution of potassium hydroxide to the free acid, as described above. When recrystallized from acetone, α-3-(acetylamino - 2,4,6 - triiodophenoxy)-p-iodophenylacetic acid melts at 214° C. (decomp.), $R_F$=0.13.

Ethyl α-bromo-p-tolylacetate can be condensed in an analogous manner to yield ethyl α-(3-acetylamino-2,4,6 - triiodophenoxy) - p - tolylacetate (M.P. 213° C.) which is further converted to the free acid (M.P. 192° C., $R_F$=0.21).

The correspondingly prepared α - (3 - acetylamino-2,4,6-triiodophenoxy)-m-tolylacetic acid melts at 175° C. ($R_F$=0.3), the α-(3-acetylamino-2,4,6-triiodophenoxy)-o-tolylacetic acid at 175°–176° C. ($R_F$=0.21).

The novel compounds of the formula

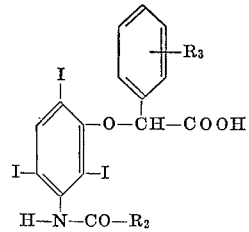

prepared by the procedure of Example 1 are used as starting materials in the synthesis of the contrast agents of the invention by alkylation.

EXAMPLE 2

A solution of 2.35 g. (0.015 mole) ethyl iodide in 1 ml. acetone was added drop by drop over a period of 15 minutes to a solution of 6.7 g. (0.01 mole) α-(3-acetylamino-2,4,6-triiodophenoxy)-phenylacetic acid in 10 ml. 4 N aqueous potassium hydroxide at 30° to 35° C. with stirring. The mixture so obtained was stirred for three hours at 40° C., then diluted with 150 ml. water, and extracted with ethyl ether.

The aqueous residue was exposed to a vacuum to remove dissolved ether, and acidified with 18% hydrochloric acid to precipitate 6.95 g. crude α-(3-N-ethyl-N-acetylamino-2,4,6-triiodophenoxy)-phenylacetic acid melting at 135°–140° C. When briefly heated with a little ethyl acetate, the crude product was purified and had a melting point of 180° C., an $R_F$ value of 0.52. It was identified by its equivalent weight and by elementary analysis as $C_{18}H_{16}I_3NO_4$.

Calculated: Eq. wt. 691; C, 31.28%; I, 55.10%.
Found: Eq. wt. 700; C, 31.17%; I, 54.91%.

The free acid is practically insoluble in water even at the boiling point, moderately soluble in ethanol and chloroform, and readily soluble in methanol at 20° C. and in boiling chloroform, and readily soluble in boiling methanol and ethanol.

The salts were prepared from equivalent amounts of the free acid and of the bases in organic solvents in which the salts are only sparingly soluble. The N-methylglucamine salt was thus prepared by simultaneously dissolving the acid and the base in a minimal amount of water and adding a large excess of ethanol from which the salt was made to crystallize by means of a seed crystal. Other salts are prepared in an analogous or any other conventional manner.

The sodium and N-methylglucamine salts are soluble at room temperature in approximately the same weight of water at room temperature.

Alkylation of α-(3-acetylamino-2,4,6-triiodophenoxy)-phenylacetic acid with methyl iodide in the manner described above produced α-(3-N-methyl-N-acetylamino-2,4,6-triiodophenoxy)-phenylacetic acid in a yield of 74.5%. The melting point of the purified product is 200°–203° C. It was identified by its equivalent weight and elementary analysis and has an $R_F$ value of 0.47.

The free acid is practically insoluble in boiling water, sparingly soluble in cold methanol and ethanol, moderately soluble in boiling methanol and ethanol. A saturated solution of the sodium salt contains approximately 100 g. of the salt per 100 ml. at 20° C., that of the N-methylglucamine salt approximately 40 g.

EXAMPLE 3

Methylation of 6.77 g. α-(3-propionylamino-2,4,6-triiodophenoxy)-phenylacetic acid in 10 ml. 4 N KOH with 2.13 g. methyl iodide in 1 ml. acetone at 40° C. in the manner described in more detail in Example 2 gave 6.4 g. α-(3 - N-methyl - N - propionylamino-2,4,6-triiodophenoxy)-phenylacetic acid which melted at 92° C. (decomp.). When heated five minutes in ethyl acetate, it changed its crystal form, and a purified compound melting at 178°–180° C. was obtaind.

It was identified as $C_{18}H_{16}I_3NO_4$ by its equivalent weight and by elementary analysis:

Calculated: Eq. wt., 691; C, 31.28%; I, 55.10%. Eq. wt., 695; C, 31.33%; I, 54.95%.

The thin layer chromatogram on silica gel with chloroform-glacial acetic acid gave an $R_F$ value of 0.46.

The free acid is practically insoluble in boiling water, sparingly soluble in cold methanol, ethanol and chloroform, moderately soluble in boiling chloroform, soluble in boiling methanol and ethanol. Concentrated solutions of its sodium and N-methylglucamine salts contain at least 100 g. of the salt per 100 ml. of the solution at 20° C.

EXAMPLE 4

A solution of 5.85 g. ethyl iodide in 3 ml. acetone was added drop by drop over a period of 10 minutes to a solution of 19.7 g. (0.025 mole) α-(3-acetylamino-2,4,6-triiodophenoxy)-p-iodophenylacetic acid in 33 ml. 3 N aqueous potassium hydroxide solution with agitation. The mixture was stirred for three hours at 40° C., cooled, diluted with water and extracted with ether. Ether was removed from the aqueous phase by vacuum treatment, and the liquid was stirred into 300 ml. 2% hydrochloric acid, whereby α-(3-N-ethyl-N-acetylamino-2,4,6-triiodophenoxy)-p-iodophenylacetic acid was precipitated. The recovered acid weighed 19.1 g. and melted at 135°–140° C., $R_F$=0.66.

It was identified as $C_{18}H_{15}I_4NO_4$ by its equivalent weight and by elementary analysis:

Calculated: Eq. wt., 817; C, 26.46%; I, 62.14%.
Found: Eq wt., 815.5; C, 26.40%; I, 61.98.

The free acid is practically insoluble in boiling water, readily soluble in cold methanol, ethanol and chloroform. 100 ml. of solutions saturated at 20° C. contain 25 g. of the sodium salt, more than 100 g. of the N-methylglucamine salt.

α-(3-methyl-N-acetylamino - 2,4,6 - triiodophenoxy)-p-iodophenylacetic acid was obtained in an analogous manner from α-(3-N-acetylamino - 2,4,6 - triiodophenoxy)-p-iodophenylacetic acid and methyl iodide and melted at 212°–213° C. The free acid is practically insoluble in cold water and in boiling water, only sparingly soluble in boiling methanol and ethanol. A saturated solution of the sodium salt contained 35 g./100 ml. at 20° C., a saturated solution of the N-methylglucamine salt more than 100 g.

EXAMPLE 5

6.77 g. (0.01 mole) α-(3-acetylamino-2,4,6-triiodophenoxy)-p-tolylacetic acid were dissolved in 10 ml. 4 N KOH, and a solution of 2.35 g. ethyl iodide in 1.25 ml. acetone was added drop by drop with agitation at 30° C. The reaction mixture was worked up as in the preceding examples, and 6.5 g. α-(3-N-ethyl-N-acetylamino-2,4,6-triiodophenoxy)-p-tolylacetic acid were obtained. As precipitated from the solution of the sodium salt, the acid melted at 97°–118° C., and the melting point rose to 175° C. after heating in ethyl acetate. $R_F$=0.40.

The compound was identified as $C_{19}H_{18}I_3NO_4$ by its equivalent weight and by elementary analysis:

Calculated: Eq. wt., 705; C, 32.36%; I, 54.00%. Found: Eq. wt., 705; C, 32.37%; I, 53.95.

The free acid is insoluble in boiling water, readily soluble in cold methanol, ethanol or chloroform and even more readily soluble in the boiling solvents. Saturated solutions of the sodium and N-methylglucamine salts respectively contain 75 g. and 100 g. of the salts in 100 ml. at 20° C.

The correspondingly prepared α-(3-N-methyl-N-acetylamino-2,4,6-triiodophenoxy)-p-tolylacetic acid melts at 200° C., has an $R_F$ value of 0.35, and is practically insoluble even in boiling water. Only very little dissolved in cold methanol, ethanol or chloroform. It is soluble in boiling methanol and ethanol. The sodium and N-methylglucamine salts dissolve in water very readily (more than 100 g. per 100 ml. of solution).

α - (3-N-ethyl-N-acetylamino-2,4,6-triiodophenoxy)-m-tolylacetic acid was prepared by analogous alkylation. It could not be obtained in crystalline form, sintered at 95° C. and melted at 115° C., $R_F$=0.67. It is insoluble in water, but very readily soluble in methanol, ethanol and chloroform. Saturated solutions of the sodium and N-methylglucamine salts at 20° contain about 75 g. salt per 100 ml. solution.

α-(3-N-methyl-N-acetylamino-2,4,6-triiodophenoxy)-m-tolylacetic acid was prepared in the same manner, using methyl iodide as an alkylation agent. M.P. 185° C. $R_F$=0.60.

The free acid is insoluble in water, but readily soluble in cold ethanol, and even more soluble in cold methanol. The sodium and N-glucamine salts dissolve very easily (more than 100 g. per 100 ml.).

α - (3-N-methyl-N-acetylamino-2,4,6-triiodophenoxy)-o-tolylacetic acid, similarly prepared, melts at 186° C. $R_F$=0.54. It is insoluble in boiling water, sparingly soluble in chloroform (1%), soluble in cold methanol (5%) and ethanol (3.3%) and in boiling chloroform (3.3%). It readily dissolves in boiling methanol (10%) and ethanol (12.5%). The sodium and M-methylglucamine salts dissolve very easily in water at 20° C.

The homologous α-(3-N-ethyl-N-acetylamino-2,4,6-triiodophenoxy)-o-tolylacetic acid melts at 180° C.–182° C. $R_F$=0.55. The solubilities of the acid and of its salts are closely similar to those described in the preceding paragraph.

EXAMPLE 6

8.15 g. 3-N-methyl-N-acetylamino-2,4,6-triiodophenol were added to a sodium alcoholate solution prepared from 0.38 g. sodium and 15 ml. ethanol, and dissolved by stirring. Thereafter, 4.4 g. ethyl α-bromophenylacetate were added, and the reaction mixture was refluxed for 15 hours, then cooled, and stirred into approximately 150 ml. water.

The precipitated ethyl α-(3-N-methyl-N-acetylamino-2,4,6-triiodophenoxy)-phenylacetate crystallized on standing for several hours. It weighed 10.3 g. and melted at 52°–55° C.

8 grams of the ester were saponified in a mixture of 20 ml. ethanol and 14 ml. 1 N sodium hydroxide in one hour at a boil. The crude acid precipitated from the saponification mixture melted at 125°–130° C. When purified by heating with ethyl acetate, it melted at 198°–200° C. It was identical with the same compound described in Example 2.

The 3-N-methyl-N-acetylamino-2,4,6-triiodophenol employed as a starting material was prepared in the following manner:

17 g. methyl iodide dissolved in 8 ml. acetone were added to a solution of 42.2 g. (0.08 mole) 3-acetylamino-2,4,6-triiodophenol and 21.8 g. 85% KOH (0.32 mole) in 95 ml. water. The mixture was stirred at 40° C. for three hours, then diluted with 200 ml. water, and extracted with ethyl ether. After removal of the ether by means of an applied vacuum, the aqueous, strongly alkaline solution was stirred into an excess of dilute hydrochloric acid whereby the 3-N-methyl-N-acetylamino-2,4,6-triiodophenol was precipitated. After brief heating in ethyl acetate, it melted at 174°–175° C.

The other α-phenoxyphenylacetic acid derivatives of the invention may be prepared in an analogous manner either by alkylation as described in Examples 2 to 5, or by condensation of a phenol with an α-halophenylacetic acid ester of a lower alkanol as described in Example 6. The alcohol moiety of the ester is not important, but the esters of the lower alkanols are most readily available. The esters of the carboxylic acids of the invention are obtained as intermediates in the method of Example 6.

The following additional radiopaque compounds are representative of this invention, and are prepared by either of the two methods described above:

α-(3-N-propyl-N-acetylamino-2,4,6-triiodophenoxy)-phenylacetic acid;
α-(3-N-butyl-N-acetylamino-2,4,6-triiodophenoxy)-phenylacetic acid;
α-(3-N-ethyl-N-propionylamino-2,4,6-triiodophenoxy)-phenylacetic acid;
α-(3-N-ethyl-N-butyroylamino-2,4,6-triiodophenoxy)-phenylacetic acid;
α-(3-N-ethyl-N-acetylamino-2,4,6-triiodophenoxy)-p-chlorophenylacetic acid;
α-(3-N-ethyl-N-formylamino-2,4,6-triiodophenoxy)-phenylacetic acid.

The compounds wherein $R_1$ and $R_2$ are methyl or ethyl, and $R_3$ is hydrogen or methyl combine desirable secretion properties with low toxicity in a particularly favorable manner and are preferred.

The N-alkyl-N-acylamino-triiodophenoxy-phenylacetic acids of the invention, their water soluble salts, and their lower alkyl esters may be compounded for application prior to radiography in a manner conventional in itself to provide the active ingredient in tablets, granules, capsules, dragees, suspensions and solutions for oral application, but they may also be employed otherwise, as by enema for visualizing the lower portion of the intestinal tract.

The following examples are merely illustrative of the basically conventional methods of compounding contrast compositions including compounds of the invention.

EXAMPLE 7

5 kg. α-(3-N-methyl-N-acetylamino-2,4,6-triiodophenoxy)-o-tolylacetic acid were kneaded into a dough with 2 liters starch paste containing 100 g. corn starch. When the moist mass became tacky, enough dry starch was added to permit granulation on a granulating machine. The granules were dried in a vacuum, mixed with 0.5 kg. corn starch and 25 g. magnesium stearate, and compressed into tablets each containing 500 mg. of the active ingredient.

EXAMPLE 8

5 kg. sodium salt of α-(3-N-ethyl-N-acetylamino-2,4,6-triiodophenoxy)-phenylacetic acid and 0.75 kg. granulated sugar were mixed with 0.75 kg. corn starch. The mixture was moistened with 1000 ml. 50% aqueous ethanol and thereafter granulated. The granules were dried, screened, further mixed with 0.65 kg. corn starch, 0.05 kg. talcum, and 0.05 kg. magnesium stearate, and compressed into 10,000 tablets.

EXAMPLE 9

750 g. α-(3-N-ethyl-N-acetylamino-2,4,6-triiodophenoxy)-o-tolylacetic acid, 600 g. sesame oil and 100 g. vegetal lecethin were stirred into a paste which was distributed in 1000 soft gelatine capsules.

EXAMPLE 10

Dosage units of an effervescent powder were prepared as follows:

|  | G. |
|---|---|
| α-(3-N-methyl-N-propionylamino-2,4,6-triiodophenoxy)-o-tolylacetic acid | 4 |
| Tartaric acid | 2 |
| Polyoxystearate | 0.014 |
| Sodium lauryl sulfonate | 0.014 |
| Powder sugar | 3 |
| Sodium bicarbonate | 2.5 |

The mixed components were moistened with ethanol and granulated under anhydrous conditions. Each unit was packed separately.

EXAMPLE 11

An enema for radiological examination of children was prepared to contain 2.5 g. N-methylglucamine salt of α-(3-N-methyl-N-acetylamino-2,4,6-triiodophenoxy)-phenylacetic acid and 50 g. 0.05% sodium chloride solution. The N-glucamine salt was formed in the sodium chloride solution from 1.94 g. of the corresponding free carboxylic acid and 0.56 g. N-methylglucamine.

What is claimed is:

1. A compound which is a carboxylic acid of the formula

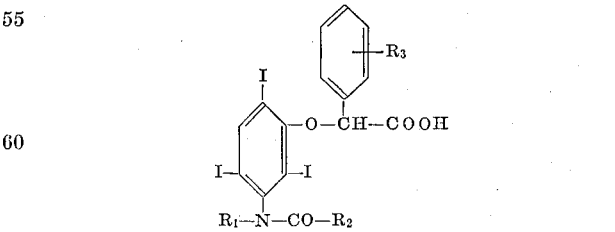

or a water-soluble salt of said acid with a physiologically tolerated metal or amine, or a lower alkyl ester of said acid, in said formula $R_1$ being lower alkyl, $R_2$ being hydrogen or lower alkyl, and $R_3$ being hydrogen, halogen of an atomic weight greater than 35, or lower alkyl.

2. A compound as set forth in claim 1, wherein $R_1$ and $R_2$ are methyl or ethyl, and $R_3$ is hydrogen or methyl.

3. A compound as set forth in claim 2, wherein $R_1$ is methyl, $R_2$ is ethyl and $R_3$ is hydrogen.

4. A compound as set forth in claim 2, wherein $R_2$ is methyl.

5. A compound as set forth in claim 4, wherein $R_3$ is hydrogen.

6. A compound as set forth in claim 4, wherein $R_3$ is m-methyl.

7. A compound as set forth in claim 4, wherein $R_3$ is o-methyl.

8. A compound of the formula

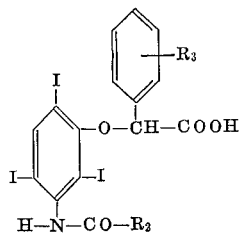

wherein $R_2$ is hydrogen or lower alkyl, and $R_3$ is hydrogen, halogen of an atomic weight greater than 35, or lower alkyl.

9. A compound of the formula

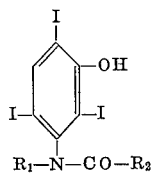

wherein $R_1$ is lower alkyl and $R_2$ is hydrogen or lower alkyl.

References Cited

UNITED STATES PATENTS 3,446,837    5/1969    Wallingford _____ 260—518

LORRAINE A. WEINBERGER, Primary Examiner

L. A. THAXTON, Assistant Examiner

U.S. Cl. X.R.

260—247.2, 471, 501.11, 562; 424—5